United States Patent [19]

Moreno

[11] Patent Number: 5,590,948

[45] Date of Patent: Jan. 7, 1997

[54] COURTESY LIGHT FIXTURE OF REARVIEW MIRROR

[75] Inventor: Ricardo P. Moreno, Sao Bernardo do Campo, Brazil

[73] Assignee: Metagal Industria e Comercio Ltds., Diadema Sao Paulo, Brazil

[21] Appl. No.: 489,895

[22] Filed: Jun. 13, 1995

[30] Foreign Application Priority Data

Feb. 9, 1995 [BR] Brazil ................................. 9403037

[51] Int. Cl.⁶ ................................................ B60Q 1/04
[52] U.S. Cl. .................... 362/83.1; 362/135; 362/140
[58] Field of Search ............................ 362/83.1, 61, 80, 362/135, 137, 226, 140, 144, 217, 237, 240, 241, 249; 439/239, 621, 698

[56] References Cited

U.S. PATENT DOCUMENTS

| | | | |
|---|---|---|---|
| 3,665,392 | 5/1972 | Annas | 362/83.1 |
| 4,000,404 | 12/1976 | Marcus | 362/135 |
| 4,764,852 | 8/1988 | Sakuma | 362/135 |
| 5,003,438 | 3/1991 | Yoshida | 362/135 |
| 5,082,452 | 1/1992 | Takano | 439/621 |
| 5,108,314 | 4/1992 | Takano et al. | 439/621 |
| 5,188,446 | 2/1993 | Miller | 362/83.1 |

FOREIGN PATENT DOCUMENTS 2112206  12/1994  Canada .

*Primary Examiner*—Denise L. Gromada
*Assistant Examiner*—Thomas M. Sember
*Attorney, Agent, or Firm*—Michael J. Striker

[57] ABSTRACT

A rearview mirror has a housing having recesses with supporting flaps, and a courtesy light fixture for a driver and for a passenger located within a respective one of the recesses. Each of the courtesy light fixtures has a lamp, and two lamp holder-electrical connectors supporting and providing electrical connection to the lamp. Each of the lamp holder-electrical connectors is formed by an elastic electrical conducting metal strip having a substantially inverted U-shape so that it can be formed and connected to the electrical wire by a progressive die, and having a first vertical portion, a second horizontal upper portion, and a third vertical portion located one after the other. The first and third vertical portions extend parallel to one another, and the first vertical portion is provided with a device for connecting an electrical wire, formed substantially by a pair of V-shaped flaps which extend outside a space defined between the vertical portions for receiving the lamp. The upper horizontal portion extends transversely relative to the vertical portions and has a part of a fixing device to be fitted to the lamp holder-electrical connector through the supporting flaps of the housing, with another part of the fixing device defined by the supporting flaps.

8 Claims, 2 Drawing Sheets

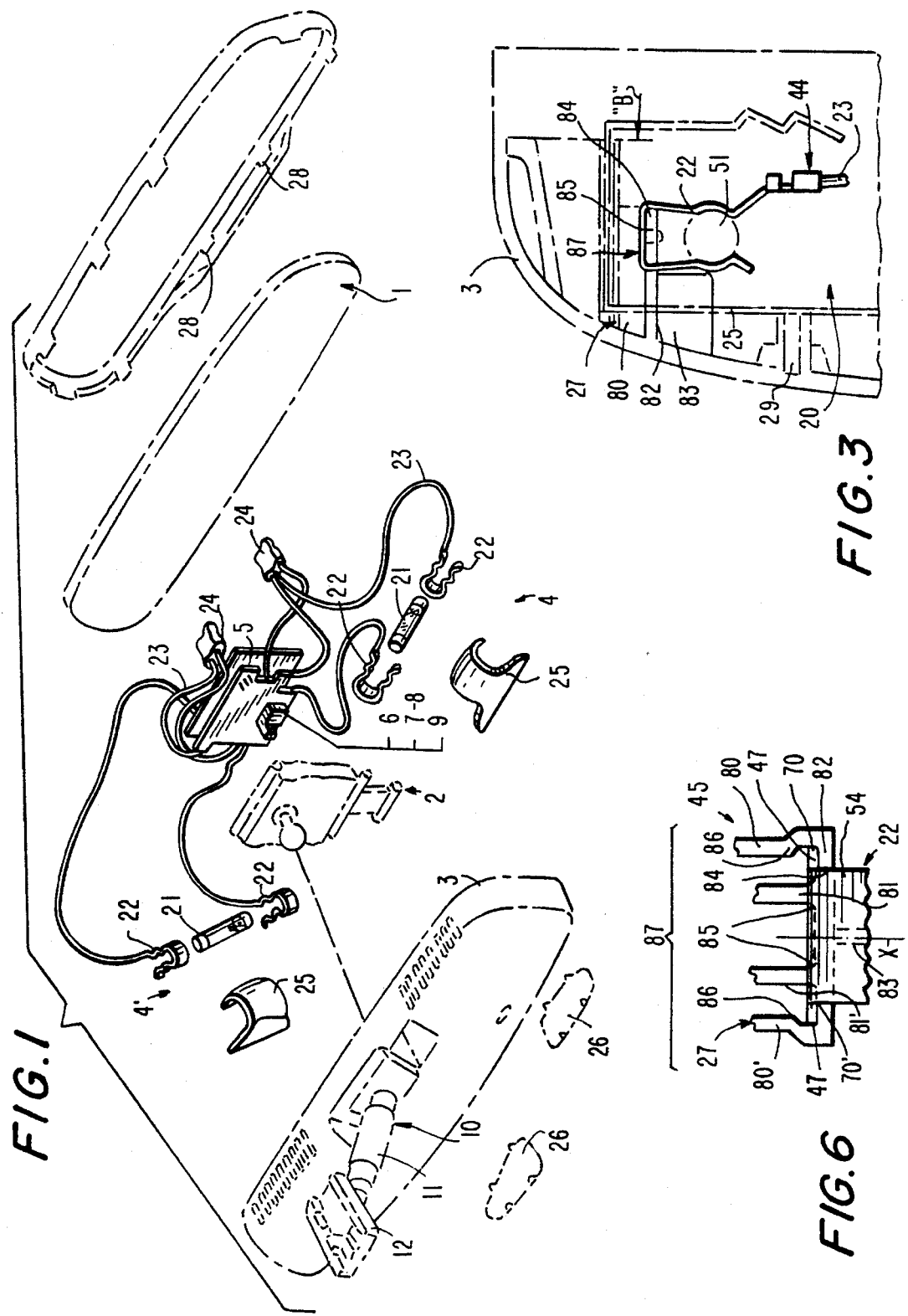

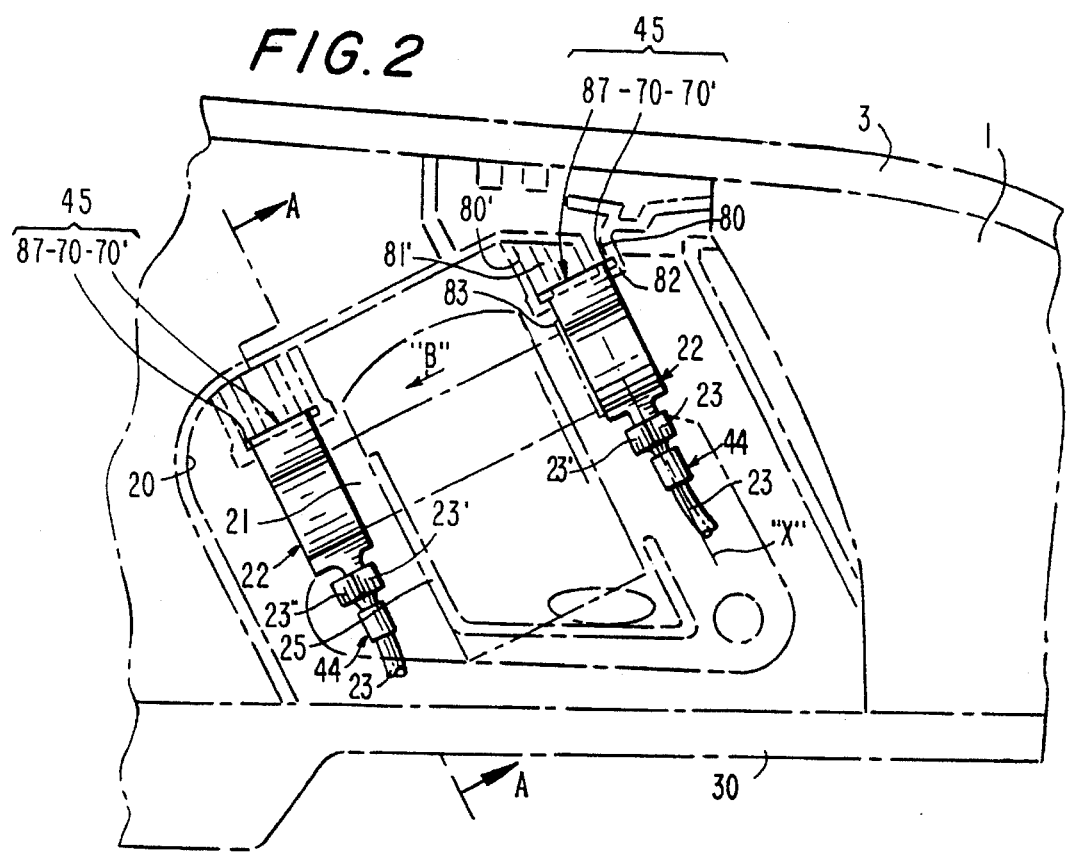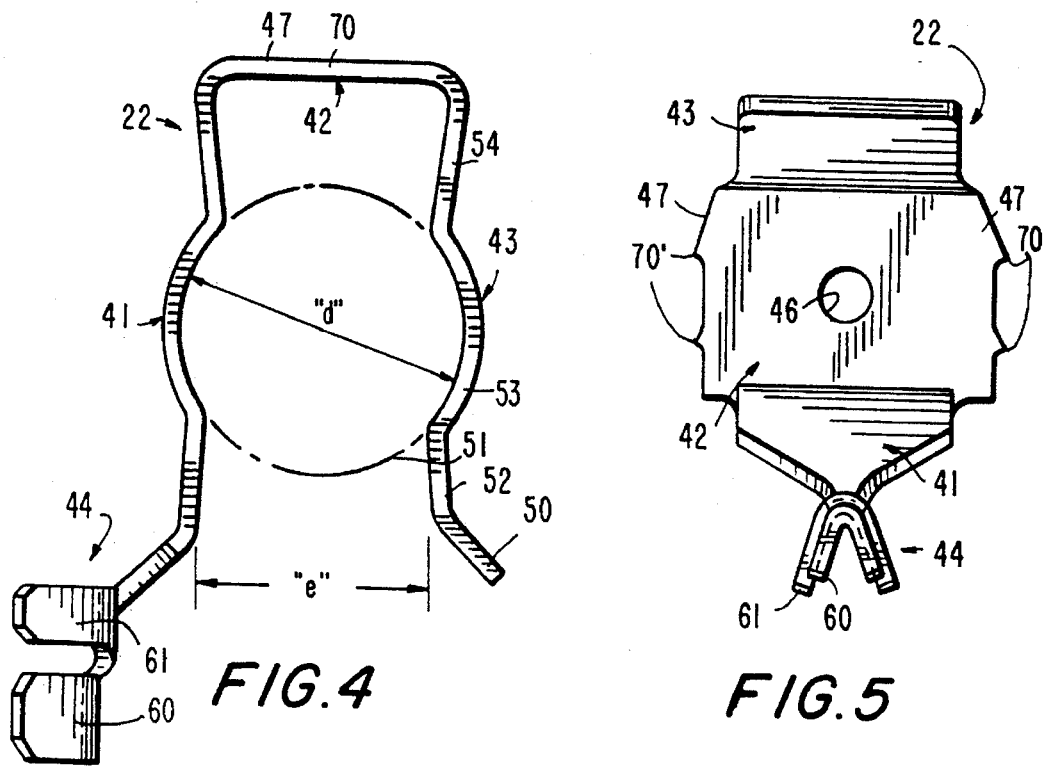

5,590,948

COURTESY LIGHT FIXTURE OF REARVIEW MIRROR

BACKGROUND OF THE INVENTION

The present invention relates to a courtesy light system for a rearview mirror which is a part of an automotive vehicle accessory field.

An internal rearview mirror with a courtesy light is known in the art. It is disclosed for example in a patent application no. PI 9302188. In this reference two courtesy light illumination kits are provided. One of the kits is arranged on the driver's side, while the other of the kits is arranged on the passenger side. Each of the kits includes essentially a cartridge type lamp, two brackets to hold the lamps, electrical connections, an electric feeding cable harness, and on-off switch, a reflector and lenses. In this construction each electrical connector bracket for the lamps is formed by a strip of electrical conducting material. The bracket is substantially U-shaped and has substantially parallel sides, between which a pressure fitted lamp socket is arranged. The end of one of the legs has an eyelet to which the electrical harness is connected, while a transverse portion of the support has an extension which defines a fixing flap extending beyond a parallel side opposite to the side which receives the harness. It connects itself between the projecting flaps projecting from the inner face of the back side wall of the mirror housing. The fixing flap is provided with fixing dents which are pressed against the supporting flaps of the housing so as to fix the bracket.

The lamp holding brackets of the above mentioned construction provide good performance from the mechanical point of view for fixing the lamp to the housing, or from the electrical point of view as to the capacity of the feeding the lamp. However, they have disadvantages in that they are difficult to manufacture, difficult to connect to the electrical harness, and difficult to assemble the mirror housing.

SUMMARY OF THE INVENTION

Accordingly, it is an object of the present invention to provide a courtesy light fixture of a rearview mirror, which avoids the disadvantages of the prior art.

In keeping with these objects and with others which will become apparent hereinafter, one feature of the present invention resides, briefly stated, in a courtesy light fixture of an internal rear view mirror in which each lamp holder-electrical connector is composed of an elastic, electrical conducting metal strip with a configuration corresponding to an inverted U and formed by portions arranged in a sequence such that a first vertical portion or leg, a second horizontal upper portion, and a third vertical portion or leg are arranged one after the other, the first and third vertical portions are parallel and substantially equal to one another, the first portion has a device formed by two pairs of V-shaped flaps to connect the electrical wire, one of the flaps is used to fix an insulated lead, while the other of the flaps fixes a bare lead of the wire, which fixes the wire in two places so that each flap of the pairs extends from the respective opposite longitudinal edges of the end of the first vertical leg of the electrical connector, the upper horizontal portion is located crosswise with respect to the vertical legs and provides part of a fixing device which fits the lamp holder brackets to the supporting portions of the rearview mirror housing, and the central portion may receive also a hole for assembling means.

When the lamp holder-electrical connector is designed in accordance with the present invention they can be produced and connected to the electrical wires by a progressive die which facilitates the manufacture and assembly of the mirror as a whole. The assembly of such lamp holder-electrical connector to the rearview mirror housing is also an easy operation which correspondingly improves the production process. On the other hand, this construction of the lamp holder-electrical connector allows for mechanical fixing of the lamp holder-electrical connector to the housing and the electrical connection to the wire harness which are not affected by vibration and/or by other stresses typically caused during the use of a rearview mirror.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing an internal rearview mirror with a courtesy light fixture, in an exploded perspective view, in accordance with the present invention;

FIG. 2 shows a detail of the inventive rearview mirror with a right side recess and a receiving socket for the courtesy light at the passenger side;

FIG. 3 is a view showing a section of FIG. 2 taken along the line A—A, with the section of the courtesy light fixture, at the same level of one of the lamp holder-electrical connectors;

FIG. 4 is a view showing a lamp holder-electrical connector for the lamp, which is a part of the courtesy light fixture, according to the present invention, in a frontal view;

FIG. 5 is a plan view of the lamp holder-electrical connector; and

FIG. 6 is a view showing a detail B of FIG. 2, with a frontal view of extended flaps of a back side of the housing, for assembly of the lamp holder-electrical connector, and a respective connection.

DESCRIPTION OF THE PREFERRED EMBODIMENTS

A courtesy light fixture in accordance with the present invention is a part of an internal rearview mirror which includes a set of mirror 1 fixed to an anti-glaring mechanism 2 and accommodated in a housing 3 as shown in FIG. 1. It contains also a courtesy illumination fixture 4' for a driver 4 and for a passenger 4' fed by an electronic feeding-timer module 5 which also controls a sealing light 6. Courtesy lights 7 and 8 are located in the door compartments and a trunk light 9 is provided. The housing 3 is hinged to a retractable support 10 formed by a spring-loaded neck portion 11 and base 12 mounted on the sealing of the vehicle cabin close to the upper middle point of the front windshield and/or directly on the windshield.

The elements which form the internal rearview mirror are not described here in detail, except for the courtesy lights 4, 4'. They are sufficiently disclosed in the above mentioned patent application which is incorporated here by reference.

Each set of the courtesy lights, for the driver 4 and for the passenger 4', is located within a respective recess 20 provided in the housing 3 as shown in FIGS. 1, 2 and 3. It is formed basically by a cartridge or torpedo-type lamp 21. Two lamp holder-electrical connectors 22 are provided for support and electrical connection for the lamp 21. An electrical feeding wire harness 23 for the lamp 21 is connected to the lamp holder-electrical connectors 22. An on/off switch 24 shown in FIG. 1 is connected to the wire harness 23. A reflector 25 an a lens 26 are further provided. The lamp holder-electrical connector 22 are assembled in their respective sets of supporting flaps 27, which project from the back face of the housing 3. The on/off switch 24 is assembled in a recess 28 of the housing 1. The reflector 25 is assembled turrets 29 which project from the back face of the housing 3.

In accordance with the present invention, each lamp holder-electrical connector 22 shown in FIGS. 4 and 5 is formed by an elastic, electrical conducting metal strip shaped in general as an inverted U so that it can be shaped and connected to the electrical wire harness 23 by a progressive die. It has a vertical leg 41, a second horizontal upper portion 42 and a third vertical leg 43 located one after the other. The first vertical leg 41 and the third vertical leg 43 are parallel and substantially equal to one another. The first vertical leg has a device 44 to connect to the electrical wire 23. The upper horizontal portion 42 extends transverse to the vertical legs and forms a part of a fixing device 45 for fitting the lamp holder-electrical connector 22 to the supporting flaps 27 of the housing 3 of the rearview mirror. The portion 42 also has a hole 46 which can receive assembling means.

The first vertical leg 42 and the third vertical leg 43 are formed by free ends which are bent in an outward angle 50 defining a vertical bracket for a respective electrical terminal 51 of the cartridge or torpedo-type lamp 21, and by three in-line portions for receiving the electrical contact 51. This three in-line portion include first straight portions 52 spaced from one another by a distance "e" which is less than the diameter "d" of the electrical contact 51, the second, intermediate convex curved portions 53 which define a circular portion to receive under pressure the electrical contact of the lamp 51, and the last diverging portions 54 which are separated from one another by a distance "e" smaller than the diameter "d" of the electrical contacts 51. This distance increases to a maximum value when they are connected to the upper horizontal portion 42.

The device 44 which connects the first vertical leg 41 to the electrical wire 23 includes two pairs of V-shaped flaps located one after the other and including a first pair of wider flaps 60 for fixing an insulated portion of the electrical wire 23 provided on a free end of the outward turned end 50 of the first vertical leg 41, and a second pair of narrower flaps 61 for fixing a bare end of the wire through the bent flaps 23' and 23". The pair of the V-shaped flaps 60 and 61 extends outside the space defined by the vertical legs 41 and 43 and which receives the lamp 21. This pair of flaps extends beyond the outward bent end portion 50.

The device 45 for fixing the lamp holder-electrical connector 22 to the supporting flaps 27 of the housing 3 of the rearview mirror includes the second horizontal portion 42 of the lamp holder-electrical connector 22. It is slightly wider than the first vertical leg 41 and the third vertical leg 43 defining the opposite flaps 47 for fitting and support between the supporting flaps 27. Cuneiform dents 70, 70' are provided for mounting of the supporting flap 27 and have sharp protuberant edges and angles, which face the opposite direction of the insertion movement of the lamp holder-electrical connector 22 between the supporting flaps 27.

The device 45 for fixing the lamp holder-electrical connector 22 to the supporting flaps 27 of the housing 3 of the rearview mirror includes also the supporting flaps 27 shown in FIGS. 2, 3 and 6. They are formed by four upper vertical flaps which are symmetrical relative to an "x" geometric axis. There are two outside flaps 80, 80' two inside flaps 81, 81', an intermediate horizontal flap 82, and a central, lower vertical flap 83.

The intermediate horizontal flap 82 has a free front edge provided with an indentation 84. It is symmetrical relative to an "x" geometrical axis and has a width slightly larger than the width of the vertical legs 41 and 43 of the lamp holder-electrical connector 22. Its depth is substantially equal to the distance between the legs 41 and 43 so that the indentations 84 may receive the extreme portion 54 of the vertical legs 41, 43 which follow the horizontal portion 42. Therefore the portion 41 provided with the connecting device 44 connected with the wire 23 is in the same plane of the free edge portion of the intermediate horizontal flap 82 adjacent to the indentation 84.

The internal upper vertical flaps 81, 81' are provided with indentations 85 located in the area of their lower edge at the same level as the indentation 84. The depth of the indentations 85 is slightly greater than the thickness of the metal strip which forms the lamp holder-electrical connector 22. The outside upper vertical flaps 80, 80' have ends connected to an intermediate horizontal flap 82 and are provided with outward bends 86.

The bends 86 of the outside upper vertical flaps 80, 80' and the indentations 84 of the intermediate horizontal portion 82 and also the indentations 85 of the internal upper vertical flap 81, 81', define a housing 87 for fitting of the upper horizontal portion 42 of the lamp holder-electrical connector 22, for supporting the side flaps 47 of the upper horizontal portion 42 on the regions of the intermediate horizontal flap 82 adjacent to the indentation 84, and for setting the dents 70, 70' of the side flap 47 of the upper horizontal portion 42 in the bottom of the bends 86 of the outside upper vertical flaps 80, 80'.

The central lower vertical flap 83 supports the lamp holder-electrical connector 22 and helps in avoiding its oscillations.

It will be understood that each of the elements described above, or two or more together, may also find a useful application in other types of constructions differing from the types described above.

While the invention has been illustrated and described as embodied in an internal rearview mirror with courtesy light fixture, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A rearview mirror, comprising a rearview mirror housing having recesses with supporting flaps; a courtesy light fixture for a driver and a second courtesy light fixture for a passenger located within a respective one of said recesses, each of said courtesy light fixtures including a lamp, two lamp holder-electrical connectors supporting and providing electrical connection to said lamp, an electric wire for feeding electrical current to said lamp and connected to said lamp holder-electrical connectors, an on/off switch connected with said electrical wire, a reflector, and a lens, each of said lamp holder-electrical connectors being formed by an elastic electrical conducting metal strip having a substantially inverted U-shape so that it can be formed and connected to said electrical wire by a progressive die, said metal strip having a first vertical portion, a second horizontal upper portion, and a third vertical portion located one after the other, said first and third vertical portions extending parallel to and being substantially equal to one another, said first vertical portion being provided with a device for connecting said electrical wire, said device for connecting said electrical wire being formed substantially by a pair of V-shaped flaps which extend outside a space defined between said vertical portions for receiving said lamp, said flaps extending from opposite edges and being turned outwards from said first vertical portion, said upper horizontal portion extending transversely relative to said vertical portions and having a part of a fixing device to be fitted to said lamp holder-electrical connector through said supporting flaps of said housing, with another part of said fixing device defined by said supporting flaps, said upper horizontal portion being provided with a hole for receiving an assembly means.

2. A rearview mirror as defined in claim 1, wherein said lamp is a cartridge type lamp.

3. A rearview mirror as defined in claim 1, wherein said lamp is a torpedo-type lamp.

4. A rearview mirror as defined in claim 1, wherein said lamp has electrical contacts, said first and third vertical legs being formed by free ends bent in an outward angle defining a receiving bracket for a respective one of said electrical contacts of said lamp, and including three in-line portions for receiving said electrical contacts, said three in-line portions including first straight portions spaced from one another by a distance which is smaller than a diameter of said electrical contacts, second intermediate convex curved portions defining a circular portion which receives under pressure said one of said electrical contacts of said lamp, and diverging portions which are separated from one another by a distance smaller than the diameter of said electrical contacts, said distance increasing to a maximum value where said vertical portions connect to said upper horizontal portion.

5. A rearview mirror as defined in claim 4, wherein said V-shaped flaps of said device for connection of said first vertical leg to said electric wire has a pair of wider flaps for fixing an insulated portion of said electrical wire on a free end of said outward turned end of said first vertical leg, and a second pair of narrower flaps for fixing a bare end of said wire through bent flaps.

6. A rearview mirror as defined in claim 1, wherein said device for fixing said lamp holder-electrical connector to said supporting flaps of said housing includes said second horizontal portion of said lamp holder-electrical connector which is somewhat wider than the said first and said third vertical portions defining opposite flaps for fitting and supporting between said supporting flaps, said lateral flaps being provided with cuneiform dents for mounting said supporting flaps with sharp protuberant edges and angles facing an opposite direction of an insertion movement of said lamp holder-electrical connector between said supporting flaps.

7. A rearview mirror as defined in claim 1, wherein said device for fixing said lamp holder-electrical connectors to said supporting flaps of the housing includes also said supporting flaps formed by four upper vertical flaps which are symmetrical relative to an "x" geometric axis and including two outside flaps, two inside flaps, an intermediate horizontal flap, and a central, lower vertical flap, said intermediate horizontal flap having a front free edge provided with an indentation symmetrical relative to said "x" geometrical axis and a width which is somewhat greater than a width of said vertical legs of said lamp holder-electrical connector and with a depth which is substantially equal to a distance between said vertical legs, so that said indentation can receive extreme portions of said vertical legs which follow said horizontal portion so that said first vertical portion provided with said connecting device connected to said wire is in a same plane of a free edge portion of said intermediate horizontal flap adjacent to said indentation.

8. A rearview mirror as defined in claim 7, wherein said internal upper vertical flaps have lower edges and provided in an area of said lower edges at a same level of said indentation, with respective indentations having a width which is somewhat greater than a thickness of said metal strip which forms said lamp holder-electrical connector, said outside upper vertical flaps having ends connected to said intermediate horizontal flap provided with outward bends, said outward bends of said outside upper vertical flaps and said indentation of said intermediate horizontal portion and said indentations of said internal upper vertical flaps defining a housing a fitting of said upper horizontal portion of said lamp holder-electrical connector for supporting said side flaps of said upper horizontal portion in regions of said intermediate horizontal flap adjacent to said indentation and for setting of said dents of said side flaps of said upper horizontal portion in a bottom of said bends of said outside upper vertical flaps, said central lower vertical flaps supporting said lamp holder-electrical connector.

* * * * *